US012694998B2

(12) United States Patent
Conrad

(10) Patent No.: US 12,694,998 B2
(45) Date of Patent: Jul. 28, 2026

(54) SHAFT COUPLING AND UNCOUPLING TOOL

(71) Applicant: Westinghouse Electric Company LLC, Cranberry Township, PA (US)

(72) Inventor: John W. Conrad, Butler, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 230 days.

(21) Appl. No.: 18/485,548

(22) Filed: Oct. 12, 2023

(65) Prior Publication Data

US 2025/0125062 A1      Apr. 17, 2025

(51) Int. Cl.
G21C 19/20 (2006.01)
B23P 19/04 (2006.01)

(52) U.S. Cl.
CPC ............ G21C 19/207 (2013.01); B23P 19/04 (2013.01)

(58) Field of Classification Search
CPC ...... G21C 19/19; G21C 19/10; G21C 19/115; G21C 19/105; G21C 19/207; B23P 19/04
See application file for complete search history.

(56) References Cited

U.S. PATENT DOCUMENTS

2014/0198889 A1* 7/2014 Harkness ............. G21C 19/105
376/268

* cited by examiner

*Primary Examiner* — Lee A Holly
(74) *Attorney, Agent, or Firm* — K&L Gates LLP

(57) ABSTRACT

A tool for uncoupling and coupling an extension shaft assembly from a control element assembly of a nuclear reactor during reactor servicing is disclosed. The extension shaft assembly is transitionable between a coupled configuration where the extension shaft assembly is coupled to the control element assembly and an uncoupled configuration where the extension shaft assembly is uncoupled from the control element assembly. The tool comprises a support structure selectively attachable to the extension shaft assembly, a linear actuator, a microcontroller, a power source connector, a plunger shaft selectively attachable to the extension shaft assembly, and a sensor coupled to the microcontroller and the linear actuator. The sensor monitors a parameter indicative of a force experienced by the extension shaft assembly during at least one of a first actuation stroke or a second actuation stroke of a linear drive of the linear actuator.

22 Claims, 11 Drawing Sheets

SHAFT COUPLING AND UNCOUPLING TOOL

FIELD

The present disclosure is generally related to nuclear power generation and, more particularly, is directed toward coupling and uncoupling an extension shaft assembly from a control element assembly of a nuclear reactor during reactor servicing.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a tool for uncoupling and coupling an extension shaft assembly from a control element assembly of a nuclear reactor during reactor servicing is disclosed. In at least one aspect, the extension shaft assembly is transitionable between a coupled configuration where the extension shaft assembly is coupled to the control element assembly and an uncoupled configuration where the extension shaft assembly is uncoupled from the control element assembly. In at least one aspect, the tool comprises a support structure selectively attachable to the extension shaft assembly, a linear actuator comprising a linear drive that is actuatable relative to the support structure through an actuation stroke, a microcontroller coupled to the linear actuator, a power source connector coupled to the microcontroller, a plunger shaft selectively attachable to the extension shaft assembly, and a sensor coupled to the microcontroller and the linear actuator. The microcontroller is to actuate the linear drive of the linear actuator. The power source connector is to be coupled to a power source for supplying power to the microcontroller and the linear actuator. The plunger shaft is movable relative to the support structure and is operably engaged with the linear drive. The extension shaft assembly is transitionable from the coupled configuration to the uncoupled configuration when the support structure is attached to the extension shaft assembly, the plunger shaft is attached to the extension shaft assembly, and the linear drive of the linear actuator moves the plunger shaft through a first actuation stroke in a first direction. The extension shaft assembly is transitionable from the uncoupled configuration to the coupled configuration when the support structure is attached to the extension shaft assembly, the plunger shaft is attached to the extension shaft assembly, and the linear drive of the linear actuator moves the plunger shaft through a second actuation stroke in a second direction opposite the first direction. The sensor monitors a parameter indicative of a force experienced by the extension shaft assembly during at least one of the first actuation stroke or the second actuation stroke.

In at least one aspect, the microcontroller prevents the supply of power from the power source to the linear actuator based on the monitored parameter and a predetermined threshold. In at least one aspect, the microcontroller prevents the supply of power from the power source to the linear actuator based on the monitored parameter exceeding the predetermined threshold during at least one of the first actuation stroke or the second actuation stroke. In at least one aspect, the sensor comprises a load cell. In at least one aspect, the tool further comprises an indicator to indicate to a user the monitored parameter. In at least one aspect, the indicator comprises an electronic display to display the monitored parameter. In at least one aspect, the tool further comprises the power source. In at least one aspect, the power source comprises at least one battery pack that is selectively attachable to the power source connector. In at least one aspect, the power source comprises at least one rechargeable battery pack. In at least one aspect, the power source comprises at least one replaceable battery pack. In at least one aspect, the microcontroller is to be coupled to at least one backup power source.

In various aspects, a tool for uncoupling an extension shaft assembly from a control element assembly of a nuclear reactor during reactor servicing is disclosed. In at least one aspect, the extension shaft assembly is transitionable from a coupled configuration where the extension shaft assembly is coupled to the control element assembly to an uncoupled configuration where the extension shaft assembly is uncoupled from the control element assembly. In at least one aspect, the tool comprises an upper assembly, an attachment mechanism, and a sensor. The upper assembly comprises an electronic actuator, a microcontroller coupled to the electronic actuator, and a power source connector coupled to the microcontroller. The electronic actuator comprises a driver that is actuatable relative to the upper assembly. The microcontroller is to actuate the driver of the electronic actuator. The power source connector is to be coupled to a power source for supplying power to the microcontroller and the electronic actuator. The attachment mechanism is supported by the upper assembly and is selectively attachable to the extension shaft assembly. The extension shaft assembly is transitioned from the coupled configuration to the uncoupled configuration when the attachment mechanism is attached to the extension shaft assembly and the driver of the electronic actuator moves a portion of the attachment mechanism through an actuation stroke. The sensor is coupled to the microcontroller and the electronic actuator. The sensor monitors a parameter indicative of a force experienced by the extension shaft assembly during the actuation stroke.

In at least one aspect, the microcontroller prevents the supply of power from the power source to the electronic actuator based on the monitored parameter and a predetermined threshold. In at least one aspect, the microcontroller prevents the supply of power from the power source to the electronic actuator based on the monitored parameter exceeding the predetermined threshold during the actuation stroke. In at least one aspect, the sensor comprises a load cell. In at least one aspect, the tool further comprises an indicator to indicate to a user the monitored parameter. In at least one aspect, the indicator comprises an electronic display to display the monitored parameter. In at least one aspect, the tool further comprises the power source. In at least one aspect, the power source comprises at least one battery pack that is selectively attachable to the power source connector. In at least one aspect, the power source comprises at least one rechargeable battery pack. In at least one aspect, the power source comprises at least one replaceable battery pack. In at least one aspect, the microcontroller is to be coupled to at least one backup power source.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figures 1, 2:
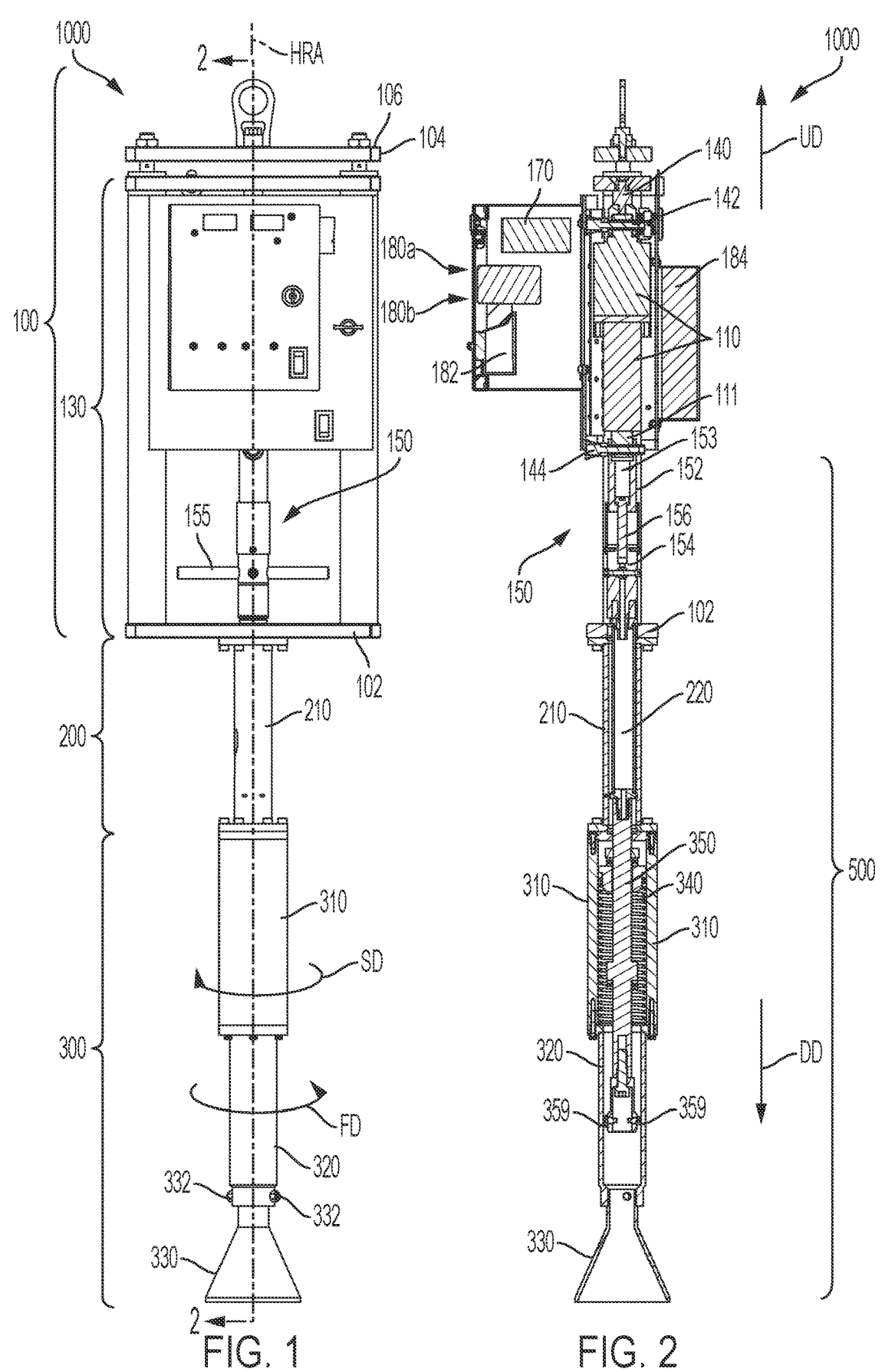
FIG. 1 is a front view of a tool used for coupling and uncoupling an extension shaft assembly from a control element assembly of a nuclear reactor, illustrating an upper assembly, an intermediate assembly, and a lower assembly of the tool.
FIG. 2 is a cross-section view of the tool of FIG. 1.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the following description, reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor ("DSP"), programmable logic device ("PLD"), programmable logic array ("PLA"), or field programmable gate array ("FPGA"), state machine circuitry, firmware that stores instructions executed by programmable circuitry, and any combination thereof. The control circuit may, collectively or individually, be embodied as circuitry that forms part of a larger system, for example, an integrated circuit ("IC"), an application-specific integrated circuit ("ASIC"), a system on-chip ("SoC"), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof. Additionally, it shall be appreciated that, as referenced herein, any specific type of control circuit can be effectively interchanged with any of the control circuits described above.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., non-volatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Before explaining various aspects of the extension shaft assembly uncoupling and decoupling tool in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

Generally, commercial nuclear reactors must be refueled periodically throughout their lifetime. In order to refuel a nuclear reactor, the reactor head is removed and an extension shaft assemblies of each control element assembly (CEA) must be uncoupled from the CEA so that the extension shaft assemblies can be removed with an upper guide structure of the reactor. After the reactor is serviced, i.e. refueled, the extension shaft assemblies must be recoupled to their respective CEA. The coupling and uncoupling operation requires that a biasing force of a high force retaining spring of the extension shaft assembly must be overcome to withdraw an inner shaft of the extensions shaft assembly from an outer shaft assembly of the extension shaft assembly. Normally, the inner shaft assembly is biased downward toward the CEA within the outer shaft assembly such that a gripper portion, or 'fingers', of the extension shaft assembly are engaged with the CEA. Sometimes even more force is required to overcome 'sticktion' caused by the previous eighteen months of service (i.e., since the last outage). The force that must be overcome to uncouple the extension shaft assembly from the CEA can be as much as 2000 lbs.

Existing tools created by Combustion Engineering (CE) are generally manual in nature and the force required to uncouple the extension shaft assemblies from the CEA was generated by a technician operating a screw jack. This manual operation was time consuming and would typically take twenty to twenty-four hours for uncoupling and another twenty to twenty-four hours of recoupling. Further, with a manually driven screw jack, there was no way to prevent the extension shaft assembly from being damage as a result of a user imparting too much force during the uncoupling and/or coupling operations.

Further, other existing tools for extension shaft assembly uncoupling and coupling utilized air driven hydraulics.

These devices use a combination of compressed air (not always available on a refuel bridge) and electricity to create a hydraulic pressure to uncouple and recouple control element shaft assemblies from/to the control element assembly. These devices enable an uncoupling/recoupling evolution to take place in about eight to ten hours instead of twenty to twenty-four hours. These devices are fairly complex with a diverse interaction of many kinds of relays, regulators, seals, an air driven hydraulic pump, and air and hydraulic cylinders. The system, in general, is comprised of a tool head with the working hydraulics, a mast that lowered the tool down to the CEA extension shaft level above the reactor, a console that contained the electronic control and pumping system that generated the hydraulic pressure, a pendant that controlled the console, and an air operated emergency release tool. Due to the amount of working parts and their complexity, this system requires constant servicing for preventative maintenance which results in delays during reactor servicing.

One solution to the above mentioned issues with existing extension shaft coupling/uncoupling tools are the tool(s) presented herein which provide a simplification of the working parts which are likely to reduce the overall downtime and maintenance costs associated with previous uncoupling/coupling tools. Specifically, the force used to uncouple/recouple the extension shaft assemblies is generated via an electrical linear actuator that requires no air or hydraulics which may not always be readily available on the refueling bridge. Further, in at least one aspect, the tool is battery operated using a rechargeable and/or replaceable battery. As such, the tool needs no outside power. Further, in at least one aspect, the tool comprises a backup power supply connector so that in the event the battery is not charged, the tool can be powered from a standard 120V power supply which is available on most refueling bridges.

Figures 16, 17:
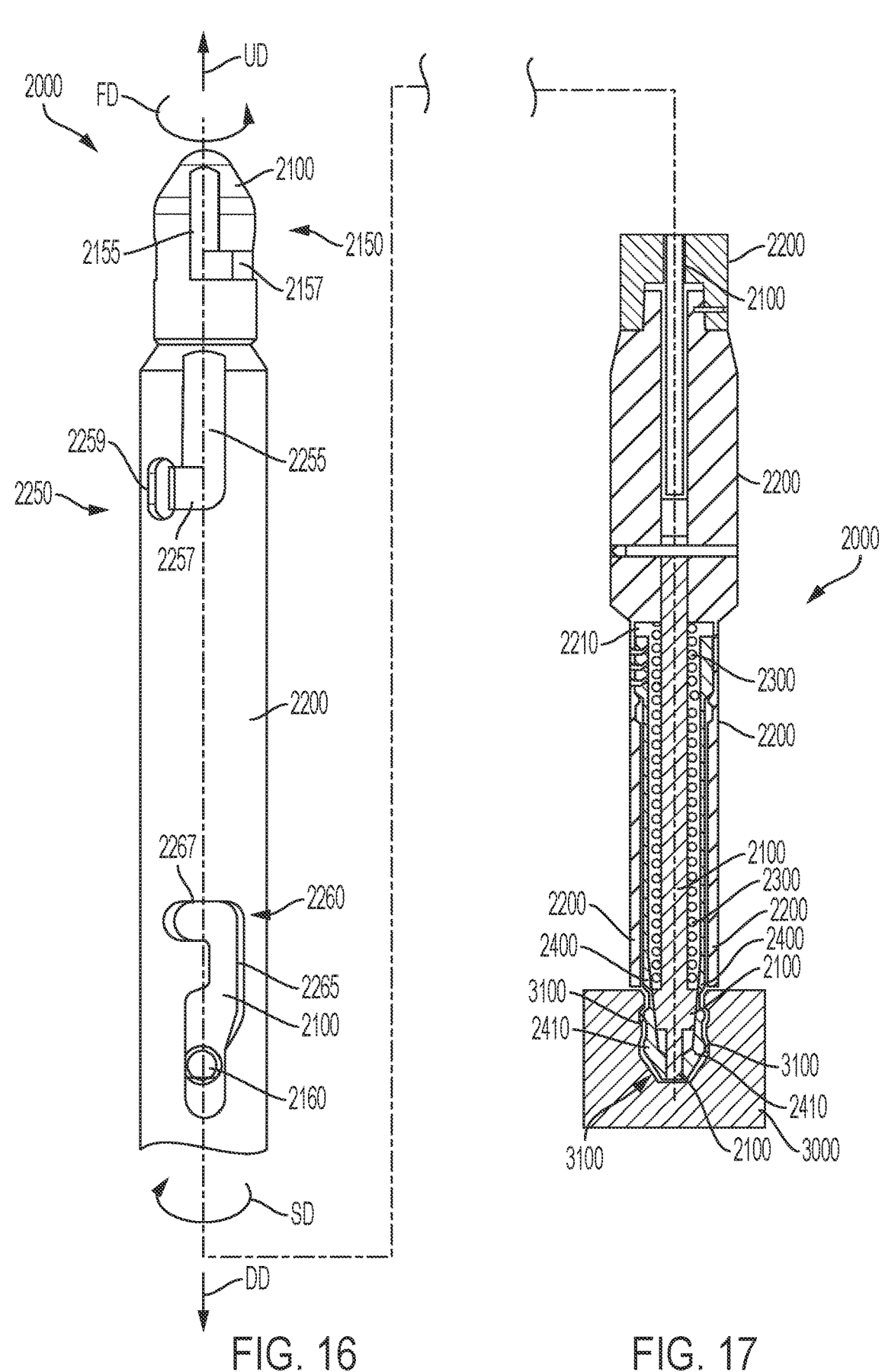
FIG. 16 is a front view of a top portion of an extension shaft assembly.
FIG. 17 is a cross-section view of a bottom portion of the extension shaft assembly of FIG. 16 illustrating the bottom end of the extension shaft assembly coupled to a control element assembly.

FIGS. 1-15 illustrate a tool 1000 for uncoupling and coupling an extension shaft assembly 2000 (see FIGS. 16 and 17) from a control element assembly (CEA) 3000 (see FIG. 17). Referring primarily to FIG. 1, the tool 1000 comprises an upper assembly 100, an intermediate assembly 200 extending downward from the upper assembly 100, and a lower assembly 300 extending downward from the intermediate assembly 200. The upper assembly 100 comprises an L-pin handle assembly 150 operably attached to a linear actuator 110 (see FIG. 2). In various aspects, the L-pin handle assembly 150, the intermediate assembly 200, and the lower assembly 300 are part of an attachment mechanism 500 which hangs from, and is supported by, a support structure 130 of the upper assembly 100. As will be described in greater detail herein, in order to uncouple and recouple the extension shaft assembly 2000 and the CEA 3000, the entire tool 1000 is maneuverable via a crane, or hoist, and the attachment mechanism 500 is manipulatable by way of the L-pin handle assembly 150 and the linear actuator 110 of the upper assembly 100.

FIGS. 3-7 illustrate the upper assembly 100 of the tool 1000. The upper assembly 100 comprises a bottom plate 102, an intermediate plate 104, and a top plate 106, among other things. The intermediate plate 104 is positioned in between the bottom plate 102 and the top plate 106. The intermediate plate 104 is supported above the bottom plate 102 by a left support tube 112 and a right support tube 114. The intermediate plate 104 is bolted to the top end of the left support tube 112 and the right support tube 114. As such, the bottom plate 102, the left support tube 112, the right support tube 114, and the intermediate plate 104 define a support structure 130 which the linear actuator 110 and other components hang from, as will be described in greater detail here.

Figure 7:
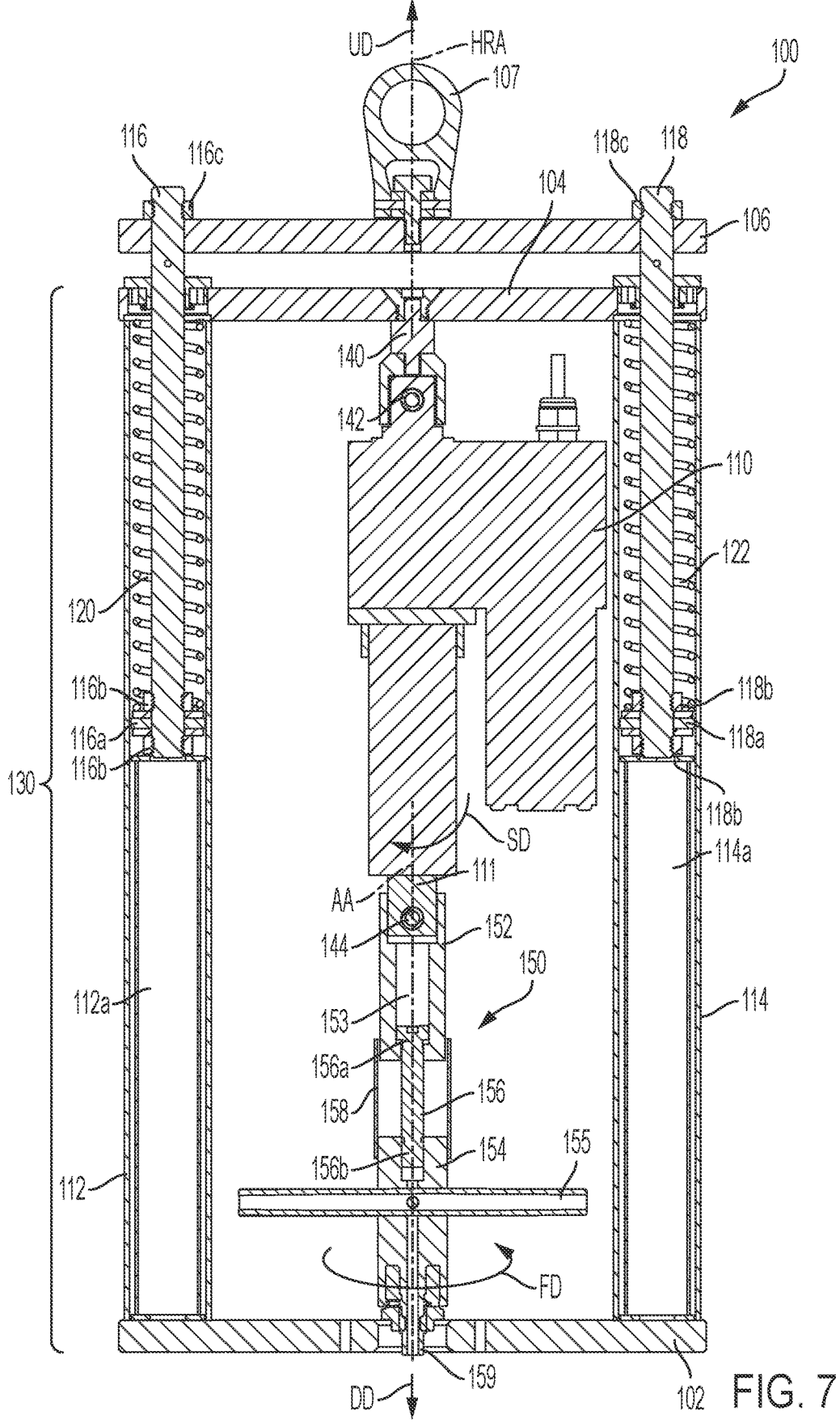
FIG. 7 is a cross-section view of the upper assembly of FIG. 6.
Figures 8, 9, 10:
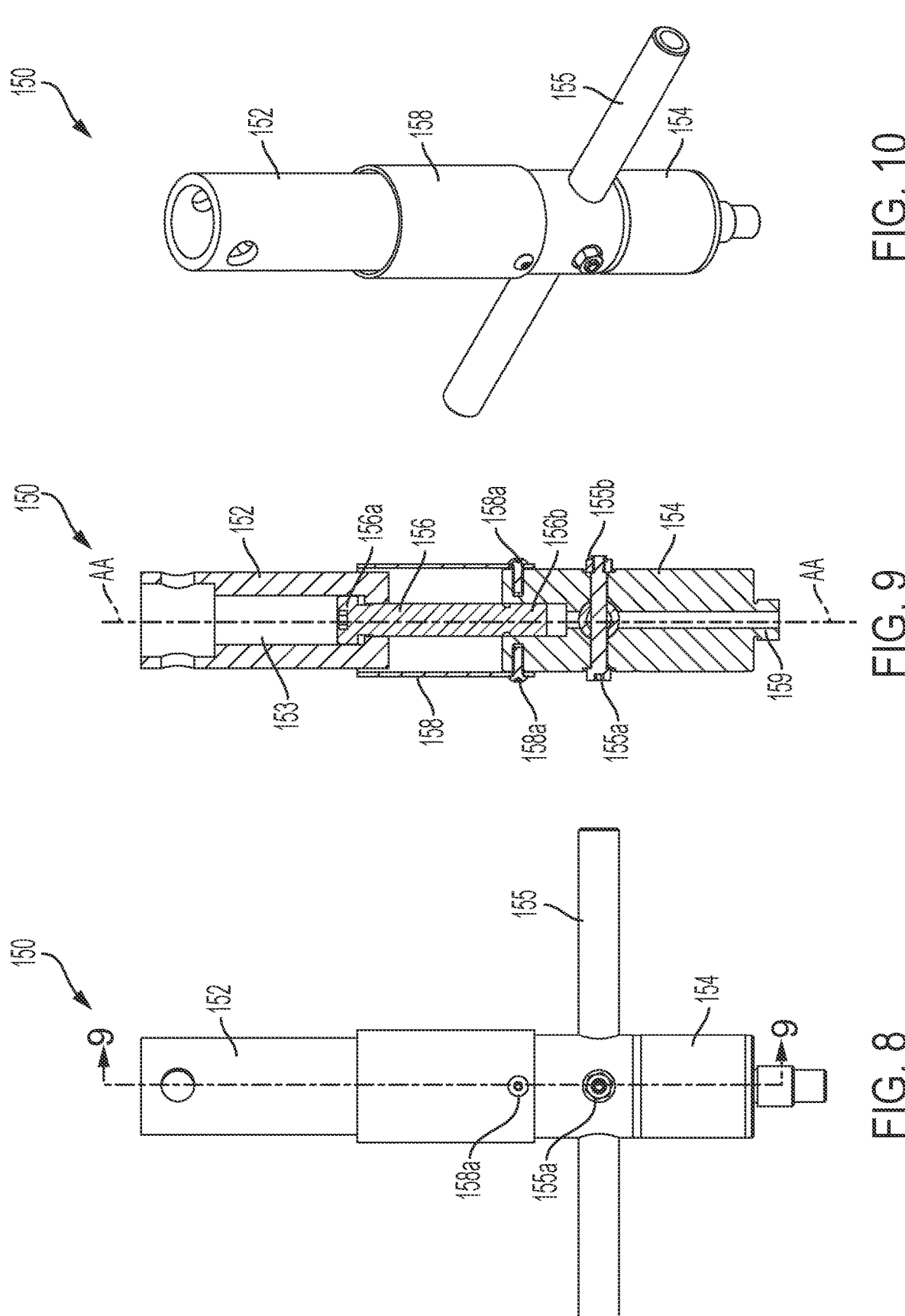
FIG. 8 is a front view of an L-pin handle assembly of the tool of FIG. 1.
FIG. 9 is a cross section view of the L-pin handle assembly of FIG. 8 taken through line 9-9 in FIG. 8.
FIG. 10 is a perspective view of the L-pin handle assembly of FIG. 8.

Referring primarily to FIG. 7, the left support tube 112 comprises a left spacer 112a therein and extending upward from the bottom plate 102 and the right tube support comprises a right spacer 114a therein and extending upward from the bottom plate 102. The upper assembly 100 further comprises a left lifting shaft 116 and a right lifting shaft 118 extending through the top plate 106 and the intermediate plate and into the left support tube 112 and the right support tube 114, respectively. The left lifting shaft 116 is supported within the left support tube 112 by the left spacer 112a and the right lifting shaft 118 is supported within the right support tube 114 by the right spacer 114a. In at least one aspect, each of the spacers 112a, 114a comprise an aperture on their top end which receives a portion of the left lifting shaft 116 and the right lifting shaft 118 therein, respectively. Further, the left lifting shaft 116 comprises a pair of washers 116a attached to its bottom end by way of a pair of nuts 116b which are threaded onto the left lifting shaft 116. The right lifting shaft 118 comprises a pair of washers 118a attached to its bottom end by way of a pair of nuts 118b which are threaded onto the right lifting shaft 118

Referring still to FIG. 7, a left spring 120 is positioned around the left lifting shaft 116 between the intermediate plate 104 and the washers 116a within the left support tube 112. A right spring 122 is positioned around the right lifting shaft 118 between the intermediate plate 104 and the washers 118a within the right support tube 114. Further, the top end of the left lifting shaft 116 comprises a left top nut 116c threadably attached thereto and the top end of the right lifting shaft 118 comprises a right top nut 118c threadably attached thereto. As such, the top plate 106 is captured between the top left and right nuts 116c, 118c and the intermediate plate 104. In at least one aspect, the top plate 106 is free to move up and down along the left and right lifting shafts 116, 118 between the intermediate plate 104 and the nuts 116c, 118c.

Further to the above, the top plate 106 comprises a swivel hoist ring 107 attached thereto for attaching the tool 1000 to a hoist. The swivel hoist ring 107 is connected to the top plate 106 and allows the top plate 106 and the portions of the tool 1000 hanging from the top plate 106 to rotate relative to the hoist ring 107 about hoist ring axis HRA (see FIG. 7). Moreover, the lifting shafts 116, 118 and the springs 120, 122 are arranged to permit the top plate 106 and hoist ring 107 to float on top of the springs 120, 122. Further, when the tool 1000 is hanging from a hoist, the springs 120, 122 will compress until the weight of the tool 1000 is supported. More specifically, the weight of the support structure 130, the intermediate assembly 200, and lower assembly 300 will compress the springs 120, 122 when the tool 1000 is hanging from the hoist. In at least one aspect, this permits a user to move the support structure 130, the intermediate assembly 200, and the lower assembly 300 up and down by hand relative to the top plate 106 and hoist ring 107 without having to re-position the hoist. In at least one aspect, the amount of play or movement a user can impart may be limited. However, in various aspects, only slight adjustments may be needed to attach the tool 1000 to the extension shaft assembly 2000 for the uncoupling and coupling operations, as will be described in greater detail herein. Further, prior to attaching the tool 1000 to the hoist, the top plate 106 floats on the springs 120, 120 relative to the intermediate plate 104 such that the top plate 106 and hoist ring 107 can move up and down relative to the intermediate plate 104. As such, in at least one aspect, a user can move the hoist ring 107 relative to the intermediate plate 104 to attach the hoist ring 107 to the hoist without having to reposition the hoist.

Referring still to FIG. 7, the upper assembly 100 further comprises a sensor 140 attached to the underside of the intermediate plate 104. In at least one aspect, the sensor 140 is a load cell. In at least one aspect, the linear actuator 110 is attached to the load cell 140 by way of a quick disconnect pin 142 and, in at least one aspect, hangs from the load cell 140. The linear actuator 110 comprises a linear drive 111 extending downward toward the bottom plate 102. The linear actuator 110 is configured to move the linear drive 111 relative to the support structure 130 of the upper assembly 100 to transmit pulling and pushing forces to the L-pin handle assembly 150. In at least one aspect, the linear drive 111 comprises an electric motor, a screw, and a nut arrangement where the rotational motion of the electric motor is converted to linear motion of the nut via the screw. In various aspects, the linear actuator may be belt driven, solenoid driven, or piezoelectric driven, and combinations thereof, for example. In at least one aspect, the linear actuator is a 2000 lb, 2" stroke, 12V linear actuator, or similar. In any event, the linear drive 111 of the linear actuator 110 is connected to the L-pin handle assembly 150 via a quick disconnect pin 144. The L-pin handle assembly 150 hangs downward from the linear drive 111 of the linear actuator 110. As such, the load cell 140, the linear actuator 110, and the L-pin handle assembly 150 hang from the intermediate plate 104 of the support structure 130 of the upper assembly 100.

Referring primarily to FIGS. 7-10, the L-pin handle assembly 150 comprises an upper housing 152 attached to the linear drive 111 by the quick disconnect pin 144 and a lower housing 154 extending downward from the upper housing 152. The L-pin handle assembly 150 further comprises a bolt 156 comprising a head portion 156a on its top end and a threaded portion 156b on its bottom end. The head portion 156a of the bolt 156 is positioned and movable within a slot 153 in the upper housing 152. The threaded portion 156b of the bolt 156 is threaded into the lower housing 154. As such, the lower housing 154 and bolt 156 attached thereto are movable relative to the upper housing 152. Further, the lower housing 154 comprises a tubular shield 158 bolted thereto by bolts 158a and extending upward toward the upper housing 152. The shield 158 prevents, or at least substantially prevents, the hand or fingers of a user of the tool 1000 from being pinched between the lower housing 154 and the upper housing 152 when the lower housing 154 moves relative to the upper housing 152. Further, the lower housing 154 comprises an L-pin handle 155 attached thereto by a bolt 155a and nut 155b. The L-pin handle 155 allows a user of the tool 1000 to vertically move the lower housing 154 relative to the upper housing 152 along axis AA as well as rotate the lower housing 154 relative to the upper housing 152 about the axis AA. In at least one aspect, the axis AA and the hoist ring axis HRA are coincident. Further, the lower housing 154 comprises a threaded protrusion 159 on its bottom end. The threaded protrusion 159 is configured to interface with portions of the intermediate assembly 200, as discussed in greater detail below.

Figures 11, 12:
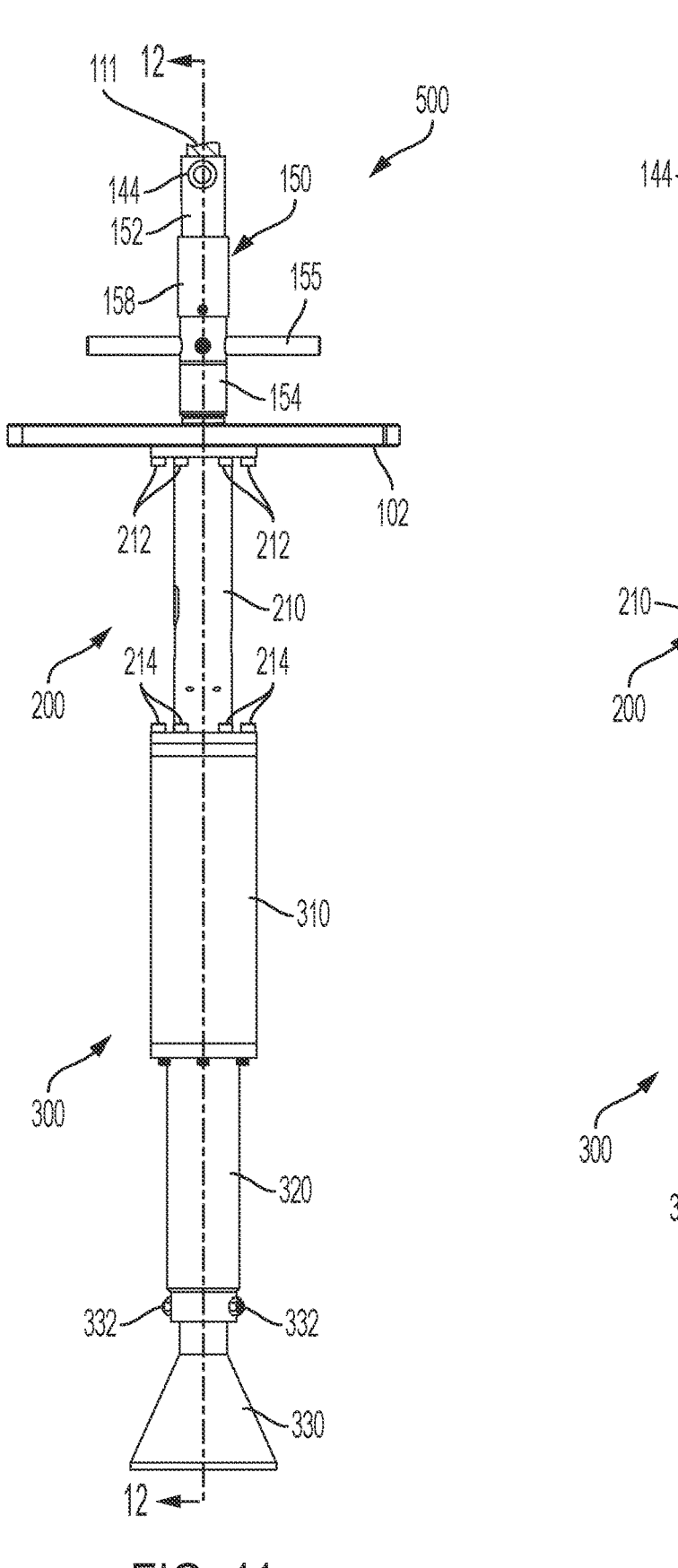
FIG. 11 is a front view of an attachment mechanism of the tool of FIG. 1 and a bottom plate of the upper assembly of the tool of FIG. 1.
FIG. 12 is a cross-section view of the attachment mechanism and bottom plate of FIG. 11 taken through line 12-12 in FIG. 11.

Referring primarily to FIGS. 11 and 12, the intermediate assembly 200 comprises an outer tube 210 and an inner shaft 220 positioned within the outer tube 210. The top end of the outer tube 210 is bolted to the bottom plate 102 of the upper assembly 100 via bolts 212 and the bottom end of the outer tube 210 is bolted to the top end of the lower assembly 300 via bolts 214. Further, the inner shaft 220 comprises a threaded hole 222 on its top end. The threaded protrusion 159 of the lower housing 154 of the L-pin handle assembly 150 is threadably received in the threaded hole 222 of the inner shaft 220 to attach the lower housing 154 to the inner shaft 220. Further, the inner shaft 220 comprises a threaded protrusion 224 on its bottom end. In at least one aspect, more than one outer tube 210 and inner shaft 220 may be utilized depending on the size of the reactor being serviced. In at least one aspect, two outer tubes and two inner shafts may be linked together to accommodate different core sizes.

Referring primarily to FIGS. 11-15, the lower assembly 300 comprises an upper tube 310, a lower tube 320, a funnel portion 330, a spring 340, and a plunger shaft 350. The upper tube 310 is bolted to the outer tube 210 of the intermediate assembly 200 via the bolts 214, as discussed above. The lower tube 320 is bolted to the upper tube 310 by way of bolts 322 and the funnel portion 330 is bolted to the lower tube 320 by way of two pins 332 that are radially positioned 180 degrees apart. The pins 332 will be hereafter referred to as J-pins 332. The J-pins 332 engage J-slots 2250 of an outer shaft 2200 of the extension shaft assembly 2000, as described further herein. Further, the plunger shaft 350 comprises a threaded hole 352 on its top end, a threaded hole 354 on its bottom end, and a boss portion 355 intermediate the threaded holes 352, 354. The boss portion 355 prevents the plunger shaft 350 from moving too far toward the downward direction DD within the upper tube 310. Specifically, the lower assembly 300 comprises a washer 369 resting on a flange 321 of the lower tube 320. The washer 369 comprises a central opening that is smaller than the inner diameter of the lower tube 320. The central opening of the washer 369 receives the plunger shaft 350 and prevents the boss portion 355 of the plunger shaft 350 from moving in the downward direction DD beyond the washer 369.

The threaded hole 352 at the top end of the plunger shaft 350 receives the threaded protrusion 224 of the inner shaft 220 to attach the plunger shaft 350 to the inner shaft 220. The threaded hole 354 at the bottom end of the plunger shaft 350 receives a bolt 356 which attaches an L-pin cup 358 to the bottom end of the plunger shaft 350. The L-pin cup 358 comprises threaded through holes which receive two threaded pins 359 that are positioned 180 degrees apart. The pins 359 will be hereafter referred to as L-pins 359. The L-pins 359 are configured to engage and disengage with L-slots 2150 of an inner shaft 2100 of the extension shaft assembly 2000, as described further herein.

Further to the above, the lower assembly 300 comprises a clamp collar 360, a thrust bearing 365, and flange 370 positioned around the plunger shaft 350. The thrust bearing 365 is positioned intermediate the clamp collar 360 and the flange 370. Further, the flange 370 is captured between spring 340 and the thrust bearing 365. In at least one aspect, the plunger shaft 350 comprises a radial groove that receives the clamp collar 360 therein. The clamp collar 360 is positioned within the radial groove of the plunger shaft 350 and is tightened to capture the clamp collar 360 within the radial groove. As such, the radial groove prevents the clamp collar 360 from moving relative to the plunger shaft 350 and, thus, the plunger shaft 350 and the clamp collar 360 move together. Further, in various aspects, the clamp collar 360 prevents the plunger shaft 350 from moving too far in the upward direction UD relative to the upper tube 310. Specifically, when the plunger shaft 350 is moved too far in the upward direction UD, the clamp collar 360 will engage the underside of a top flange 367 attached to the upper tube 310 and prevent the clamp collar 360 from moving further in the upward direction UD beyond the top flange 367. As discussed above, the boss portion 355 and washer 369 prevent the plunger shaft 350 from moving too far in the downward direction DD. As such, the plunger shaft 350 is captured within, and prevented from disengaging from, the lower assembly 300.

Figures 13, 14, 15:
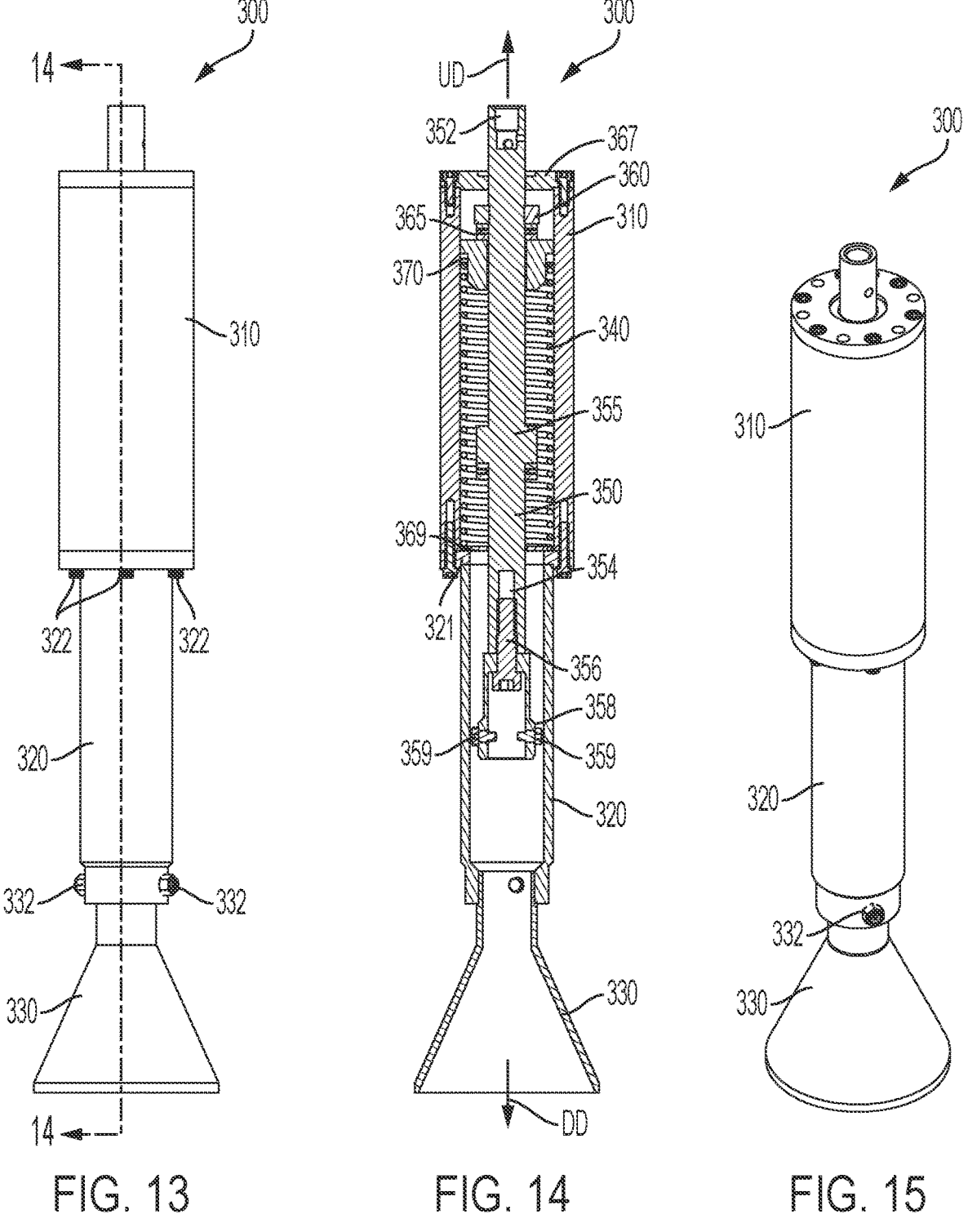
FIG. 13 is a front view of a lower assembly of the tool of FIG. 1.
FIG. 14 is a cross-section view of the lower assembly of FIG. 13 taken through line 14-14 in FIG. 13.
FIG. 15 is a perspective view of the lower assembly of FIG. 13.

Referring primarily to FIG. 14, the spring 340 is positioned around the plunger shaft 350 within the upper tube 310 and is positioned between the flange 370 and the flange 321 of the lower tube 320. As such, the clamp collar 360, thrust bearing 365, and flange 370 permit the plunger shaft 350 to be vertically supported by the spring 340 relative to the upper tube 310, the lower tube 320, and the funnel portion 330. In other words, the plunger shaft 350 can float on the spring 340 relative to the upper tube 310, the lower tube 320, and the funnel portion 330. Referring primarily to FIGS. 2 and 12, the spring 340 biases the plunger shaft 350, the inner shaft 220, the lower housing 154, and the bolt 156 in the upward direction UD.

Referring primarily to FIGS. 1, 2, 7, 11, and 12, based on the above, the outer tube 210, the upper tube 310, the lower tube 320, and the funnel portion 330 comprising the J-pins 332 are supported by and hang from the bottom plate 102 of the upper assembly 100. In at least one aspect, the support structure 130 of the upper assembly 100, the outer tube 210 of the intermediate assembly 200, and the upper and lower tubes 310, 320 of the lower assembly 300 constitute a support structure that is selectively attachable to the extension shaft assembly 2000 by way of the J-pins 332 of the lower assembly 300. Specifically, the J-pins 332 of the lower assembly 300 can be maneuvered vertically and rotationally relative to the J-slots 2250 in the extension shaft assembly 2000 by moving the entire tool 1000 via the hoist and/or rotating the entire tool 1000 about the hoist ring axis HRA. Further, finer and/or smaller vertical positional adjustments of the J-pins 332 can be made due to the springs 120, 122 in the upper assembly 100 which permit the support structure 130 of the upper assembly 100, the intermediate assembly 200, and the lower assembly 300 to vertically float relative to the hoist ring 107 and the hoist. As such, the J-pins 332 are vertically and rotationally positionable relative to the J-slots 2250 in the extension shaft assembly 2000.

Further to the above, the load cell 140, the linear actuator 110, the linear drive 111, the L-pin handle assembly 150, the inner shaft 220 of the intermediate assembly 200, the plunger shaft 350, and the L-pins 359 are supported by and hang from the intermediate plate 104 of the upper assembly 100. In at least one aspect, the linear drive 111, the L-pin handle assembly 150, the inner shaft 220 of the intermediate assembly 200, the plunger shaft 350, and the L-pins 359 are movable relative to the support structure described above. As such, the L-pins 359 of the plunger shaft 350 are vertically movable relative to the J-pins 332 of the lower assembly 300 by way of the linear actuator 110. Specifically, the linear actuator 110 is configured to move the plunger shaft 350 and L-pins upward through a pulling stroke (i.e., a first actuation stroke in a first direction) and downward through a pushing stroke (i.e., a second actuation stroke in a second direction opposite the first direction). Further, the L-pins 359 of the plunger shaft 350 are vertically and rotationally movable relative to the J-pins 332 of the lower assembly 300 by way of the L-pin handle 155 of the L-pin handle assembly 150. For example, if the L-pin handle 155 is moved upward, the plunger shaft 350 and L-pins 359 will move upward. If the L-pin handle 155 is moved downward, the plunger shaft 350 and L-pins 359 will move downward against the bias of the spring 340. The spring 340 of the lower assembly 300 biases the plunger shaft 350 including the L-pins 359, the inner shaft 220, the lower housing 154, and the bolt 156 upward which may aid the user when lifting these components. Without the spring 340, the user would have to lift the entire weight of the plunger shaft 350 including the L-pins 359, the inner shaft 220, the lower housing 154, and the bolt 156 by hand using the L-pin handle 155 of the L-pin handle assembly 150.

Referring primarily to FIGS. 7 and 12, the slot 153 in the L-pin handle assembly 150 permits smaller and/or fine vertical adjustments of the plunger shaft 350 and L-pins 359 relative to the J-pins 332 via the L-pin handle 155 of the L-pin handle assembly 150. Specifically, the slot 153 permits vertical movement of the bolt 156 within the slot 153. As described above, the bolt 156 is attached to the plunger shaft 350 by way of the lower housing 154 and the inner shaft 220. As such, the plunger shaft 350 and L-pins 359 attached thereto are vertically movable relative to the support structure 130 and the J-pins 332 by way of the L-pin handle 155. Further, rotation of the L-pin handle 155 about axis AA (FIG. 7) will result in rotation of the plunger shaft 350 and L-pins 359 relative to the J-pins 332 of the funnel portion 330. In at least one aspect, a user can rotate the L-pin handle 155 to rotate the plunger shaft 350 and L-pins 359 thereof relative to the J-pins 332 of the lower assembly 300. As such, the L-pins 359 are vertically and rotationally positionable relative to the L-slots 2150 in the extension shaft assembly 2000, as will be described in greater detail below.

FIGS. 16 and 17 illustrate the extension shaft assembly 2000 coupled to the control element assembly CEA 3000 with the extension shaft assembly 2000 in a coupled configuration. The extension shaft assembly 2000 comprises an inner shaft 2100, an outer shaft 2200, a spring 2300, and a gripper portion 2400. The inner shaft 2100 is positioned, at least partially, within the outer shaft 2200. The inner shaft 2100 comprises an angled boss portion 2170 near its bottom end. The outer shaft 2200 comprises an internal cavity 2210 at its bottom end. The spring 2300 is positioned around the inner shaft 2100 and is captured between the top end of the internal cavity 2210 and the angled boss portion 2170 of the inner shaft 2100 as illustrated in FIG. 17. Further, the gripper portion 2400 is radially positioned intermediate the spring 2300 and the internal cavity 2210 of the outer shaft 2200. The gripper portion 2400 comprises fingers 2410 that are biased radially inward toward the inner shaft 2100. The boss portion 2170 of the inner shaft 2100 overcomes the bias of the fingers 2410 to maintain the gripper portion 2400 in an expanded configuration when the boss portion 2170 is positioned within the fingers 2410 of the gripper portion 2400 as illustrated in FIG. 17. Further, the spring 2300 biases the boss portion 2170 toward the bottom (i.e., toward the CEA 3000) such that the boss portion 2170 is maintained within the fingers 2410 of the gripper portion 2400 to bias the fingers 2410 radially outward and into coupling engagement with a corresponding cavity 3100 in the CEA 3000. When the inner shaft 2100 is retracted upward, the boss portion 2170 moves upward and out of alignment with the fingers 2410 such that the fingers 2410 are permitted to collapse radially inward into a collapsed configuration to operably decouple the fingers 2410 from the cavity 3100 of the CEA 3000.

Further to the above, the inner shaft 2100 comprises a pair of L-slots 2150 positioned 180 degrees apart (only one is visible in FIG. 16). Each L-slot 2150 comprises a vertical portion 2155 and a horizontal portion 2157. The L-slots 2150 are configured to receive and retain the L-pins 359 of the plunger shaft 350, as discussed in greater detail herein. Further, the outer shaft 2200 comprises a pair of J-slots 2250 positioned 180 degrees apart (only one is visible in FIG. 16). Each J-slot comprises a vertical portion 2255, a horizontal portion 2257, and a lock opening 2259. The J-slots 2250 are configured to receive and retain the J-pins 332 of the lower assembly 300. Further, the outer shaft 2200 comprises a locking slot 2260 that receives a pin 2160 extending radially outward from the inner shaft 2100. The locking slot 2260 comprises a vertical portion 2265 and a horizontal portion 2267. The locking slot 2260 and pin 2160 arrangement permits the inner shaft 2100 to be locked in an upward position relative to the outer shaft 2200 after the gripper portion 2400 of the inner shaft 2100 is decoupled from the cavity 3100 of the CEA 3000. Specifically, when the inner shaft 2100 is moved upward, the pin 2160 moves through the vertical portion 2265 of the locking slot 2260 until the pin 2160 is aligned with the horizontal portion 2267 of the locking slot 2260. The inner shaft 2100 can then be rotated, as discussed in greater detail herein, to move the pin 2160 into the horizontal portion 2267 of the locking slot 2260. When the pin 2160 is in the horizontal portion 2267, the inner shaft 2100 is locked into an upward locked position. Further, when the inner shaft 2100 is moved upward and locked into the upward locked position, the spring 2300 is compressed and is applying a biasing force to the inner shaft 2100 in the downward direction. As such, when unlocking the inner shaft 2100 from the upward locked position, the forces exerted by the spring 2300 onto the inner shaft 2100 must be released in a controlled manner to prevent damage to the extension shaft assembly 2000.

In use, to decouple an extension shaft assembly 2000 that is coupled to the control element assembly 3000 the tool 1000 is used as follows. A crane, or hoist, is attached to the hoist ring 107 of the tool 1000. The hoist is used to position the tool 1000 relative to the extension shaft assembly 2000. Specifically, the funnel portion 330 of the lower assembly 300 is used to locate the bottom end of the tool 1000 onto the upper end of the extension shaft assembly 2000. Next, the entire tool 1000 is maneuvered to locate the J-pins 332 of the lower assembly 300 into the vertical portion 2255 of their respective J-slots 2250 of the outer shaft 2200 of the extension shaft assembly 2000. Next, the entire tool 1000 is lowered via the hoist until the J-pins 332 bottom out in the vertical portion 2255 of the J-slots 2250. As discussed above, the attachment mechanism 500 and, thus, the J-pins 332 of the tool 1000 are movable vertically up and down relative to the top plate 106 and hoist ring 107 due to the springs 120, 122 of the upper assembly 100. As such, the user of the tool 1000 does not have to fight the hoist and/or does not have to use the hoist to maneuver the tool 1000 in fine increments to locate the J-pins 332 within the J-slots 2250 of the extension shaft assembly 2000. The spring 120, 122 arrangement discussed above provides the user with vertical maneuverability in fine increments in order to locate the J-pins 332 within the J-slots 2250. In any event, once the J-pins 332 are bottomed out within the vertical portions 2255 of the J-slots 2250, the entire tool 1000 is rotated about its vertical axis (i.e., the axis HRA in FIG. 1) to position the J-pins 332 into the horizontal portions 2257 of the J-slots 2250. Further rotation of the tool 1000 positions the J-pins 332 into the lock opening 2259 of the J-slots 2250. As such, the J-pins 332 lock the lower assembly 300 to the outer shaft 2200 of the extension shaft assembly 2000.

Next, the user pushes downward on the L-pin handle 155 against the bias of the spring 340 of the lower assembly 300 to move the L-pins 359 of the plunger shaft 350 of the lower assembly 300 downward through the vertical portions 2155 of the L-slots 2150 until the L-pins 359 bottom out. The J-pins 332, the J-slots 2250, the L-pins 359, and the L-slots 2150 are positioned and arranged such that when the J-pins 332 are locked within the J-slots 2250, the L-pins 359 are aligned with the vertical portions 2155 of the L-slots 2150. In any event, once the L-pins 359 bottom out in the vertical portions 2155 of the L-slots 2150, the user rotates the L-pin handle 155 in a first direction FD (FIGS. 7 and 16) which rotates the plunger shaft 350 and the L-pins 359 thereof into the horizontal portions 2157 of the L-slots 2150 to attach the plunger shaft 350 to the inner shaft 2100 of the extension shaft assembly 2000. At this time, the J-pins 332 of the lower assembly 300 are vertically locked into the lock opening 2259 of the J-slots 2250 of the outer shaft 2200 and the L-pins 359 of the lower assembly 300 are vertically locked into the horizontal portion 2157 of the L-slots 2150 of the inner shaft 2100. As such, the tool 1000 is attached to the extension shaft assembly 2000 and is ready for the user to decouple the extension shaft assembly 2000 from the CEA 3000, as discussed in greater detail below.

The user actuates the linear drive 111 of the linear actuator 110 in an upward direction UD (FIGS. 1 and 16) to retract the plunger shaft 350 upward and, thus, the inner shaft 2100 of the extension shaft assembly 2000 upward relative to the outer shaft 2200 of the extension shaft assembly 2000. As the inner shaft 2100 is retracted in the upward direction UD by the linear actuator 110, the linear actuator 110 will overcome the bias of the spring 2300 of the extension shaft assembly 2000. As discussed above, the forces needed to overcome the bias of the internal spring 2300 of the extension shaft assembly 2000 and the stiction between the inner shaft 2100 and the outer shaft 2200 may be upwards of 2,000 lbs. In any event, when the inner shaft 2100 retracts in the upward direction UD, the gripper portion 2400 of the extension shaft assembly 2000 will collapse radially inward from their expanded configuration (FIG. 17) to a collapsed configuration to decouple the extensions shaft assembly 2000 from the CEA 3000. In other words, the radially inward bias of the fingers 2410 of the gripper portion 2400 permits the gripper portion 2400 to transition from the expanded configuration (FIG. 17) to the collapsed configuration owing to the absence of the boss portion 2170 of the inner shaft 2100 within the gripper portion 2400 of the extension shaft assembly 2000.

As discussed above, in at least one aspect, the inner shaft 2100 can be locked in an upward locked position relative to the outer shaft 2200 during and/or after the extensions shaft assembly 2000 is decupled from the CEA 3000. Specifically, once the inner shaft 2100 is retracted in the upward direction UD and the gripper portion 2400 collapses, the inner shaft 2100 can be retracted further upward by the linear actuator 110 against the bias of the spring 2300. Upon further retraction of the inner shaft 2100, the pin 2160 of the inner shaft 2100 travels upward through the vertical portion 2265 of the locking slot 2260 in the outer shaft 2200 until the pin 2160 reaches the top end of the locking slot 2260. The L-pin handle 155 is then rotated to rotate the plunger shaft 350, the inner shaft 2100, and the pin 2160 of the inner shaft 2100 in a second direction SD (FIG. 16) into the horizontal portion 2267 of the locking slot 2260. As the L-pin handle 155 is rotated in the second direction SD, the L-pins 359 are now positioned once again within the vertical portions 2155 of the L-slots 2150. As such, the L-pin handle 155 can be moved upward by the user to pull the L-pins 359 of the plunger shaft 350 upward through the vertical portion 2155 of the L-slots 2150 in the inner shaft 2100 to disengage the plunger shaft 350 and L-pins 359 from the L-slots 2150 in the inner shaft 2100 of the extensions shaft assembly 2000. The inner shaft 2100 of the extension shaft assembly 2000 is now locked in the upward position owing to the position of the pin 2160 of the inner shaft 2100 in the horizontal portion 2267 of the locking slot 2260 in the outer shaft 2200. The entire tool 1000 can now be rotated about its vertical axis (i.e., the axis HRA) in the first direction FD to move the J-pins 332 through the horizontal portions 2257 of the J-slots 2250 toward the vertical portions 2255 of the J-slots 2250. Once in this position, the entire tool 1000 can be lifted vertically to completely disengage the tool 1000 from the decoupled extension shaft assembly 2000. This vertical lift may be accomplished by using the hoist to lift the entire tool 1000 or the attachment mechanism 500 and J-pins 332 thereof can be moved vertically owing to the spring 120, 122 arrangement of the upper assembly 100 discussed above. In any event, the J-pins 332 are moved in the upward direction UD through the vertical portions 2255 of the J-slots 2250 until the J-pins are completely disengaged from the J-slots 2250 of the outer shaft 2200 of the extension shaft assembly 2000. As such, both the L-pins 359 and the J-pins 332 are now completely disengage from their respective L-slots 2150 and J-slots 2250 and therefore the tool 1000 is now detached from the extension shaft assembly 2000. The tool 1000 is then hoisted away leaving the extension shaft assembly 2000 in a decoupled configuration with the inner shaft 2100 in the upward locked position relative to the outer shaft 2200. In this configuration, the gripper portion 2400 of the extension shaft assembly 2000 is still positioned within the cavity 3100 of the CEA 3000, however the fingers 2410 of the gripper portion 2400 are no longer engaged with cavity 3100. As such, the extension shaft assembly 2000 can be removed with an upper guide structure of the reactor.

To re-attach the now decoupled extension shaft assembly 2000 to the CEA 3000, similar steps to those described above are utilized except as noted below. Specifically, the hoist is used to maneuver the entire tool 1000 until the J-pins 332 move into the horizontal portions 2257 of the J-slots 2250 of the outer shaft 2200 of the extension shaft assembly 2000, as discussed above. Next, the L-pin handle 155 is pushed downward to move the L-pins 359 through the vertical portions 2155 of the L-slots 2150 and then the L-pin handle 155 is turned to engage the L-pins 359 with the horizontal portions 2157 of the L-slots 2150 in the inner shaft 2100. Once the J-pins 332 and the L-pins 359 of the tool 1000 are engage with the outer shaft 2200 and inner shaft 2100, respectively, the tool 1000 is now completely attached to the upper end of the extensions shaft assembly 2000 in the same manner as was described above. However, in this instance, the extensions shaft assembly 2000 is in a different configuration with the inner shaft 2100 locked in place in the upward locked position due to the pin 2160 of the inner shaft 2100 being positioned within the horizontal portion 2267 of the locking slot 2260 in the outer shaft 2200 during the decoupling process. In any event, as the L-pin handle 155 is rotated in the first direction FD, the pin 2160 of the inner shaft 2100 will rotate in the first direction FD until the pin 2160 is located above the vertical portion 2265 of the locking slot 2260 in the outer shaft 2200. As discussed above, the inner shaft 2100 is biased downward toward the bottom end of the extension shaft assembly 2000 by the spring 2300. In at least one aspect, in order to counteract the bias of the spring 2300, the linear actuator 110 is utilized. Specifically, the inner shaft 2100 is prevented from being driven downward toward the CEA 3000 by the spring 2300 due to its attachment with the plunger shaft 350 and the linear actuator 110. As such, the linear actuator 110 can be utilized to lower the inner shaft 2100 of the extension shaft assembly 2000 toward the CEA 3000 in a controlled manner until the boss portion 2170 of the inner shaft 2100 expands the gripper portion 2400 from its collapsed configuration to its expanded configuration (FIG. 17) and, thus, re-couples the extension shaft assembly 2000 to the CEA 3000. The J-pins 332 and the L-pins 359 can then be dis-engaged from their respective slots 2250, 2150 by maneuvering the L-pin handle 155 and the entire tool 1000 until, as described herein, the tool 1000 is completely detached from the extension shaft assembly 2000 leaving the extension shaft assembly 2000 behind and coupled to the CEA 3000.

In at least one aspect, the locking slot 2260 in the outer shaft 2200 of the extension shaft assembly 2000 may not be present. In such instances, after the gripper portion 2400 of the extensions shaft assembly 2000 collapses and the extension shaft assembly 2000 is no longer coupled to the CEA 3000, the hoist can be used to lift the entire tool 1000 and extension shaft assembly 2000 attached thereto in the upward direction UD above the CEA 3000. Once positioned above the CEA 3000, the tool 1000 can be disengaged from the extensions shaft assembly 2000 as discussed herein and the extension shaft assembly 2000 will be left on top of the CEA 3000 with the inner shaft 2100 biased downward by the spring 2300 and the gripper portion 2400 in the expanded configuration. To detach the extension shaft assembly 2000 from the tool 1000, the L-pin handle 155 is rotated and then lifted to disengage the L-pins 359 from the L-slots 2150. Then, the entire tool 1000 is rotated about the axis HRA and then lifted vertically in the upward direction UD to disengage the J-pins 332 from the J-slots 2250. Once the tool 1000 is completely detached from the extension shaft assembly 2000, the entire tool 1000 can be hoisted away leaving the extension shaft assembly 2000 resting on top of the CEA 3000 with the inner shaft 2100 biased downward by the spring 2300 and the gripper portion 2400 in its expanded configuration. In other words, the extension shaft assembly 2000 is in its coupled configuration, however, the extension shaft assembly 2000 is positioned on top of the CEA 3000 and is not coupled to the cavity 3100 of the CEA 3000. In other words, the fingers 2410 of the gripper portion 2400 of the extension shaft assembly 2000 are no longer positioned within the cavity 3100 if the CEA 3000. When the extension shaft assembly 2000 is in the coupled configuration but is resting on top of the CEA 3000, the extensions shaft assembly 2000 can be recoupled to the CEA 3000 using similar steps to those described herein, as discussed in greater detail below.

Further to the above, in order to re-couple an extension shaft assembly 2000 that is in its expanded configuration and is resting on top of the CEA 3000, first the tool 1000 is attached to the extensions shaft assembly 2000 as described herein. Specifically, the J-pins 332 and the L-pins 359 are attached to their respective J-slots 2250 and L-slots 2150 in the extension shaft assembly 2000. Next, the linear actuator 110 is actuated in the upward direction UD to move the inner shaft 2100 upward against the bias of the spring 2300 until the gripper portion 2400 is moved from its expanded configuration into its collapsed configuration. Next, the entire tool 1000 and the extension shaft assembly 2000 attached thereto is lowered until the gripper portion 2400 is located within the cavity 3100 of the CEA 3000. The L-pin handle 155 and/or the linear actuator 110 can then be utilized to lower the inner shaft 2100 toward the CEA 3000 to transition the gripper portion 2400 from its collapsed configuration to its expanded configuration and, thus, operably couple the extension shaft assembly 2000 to the CEA 3000.

Figure 5:
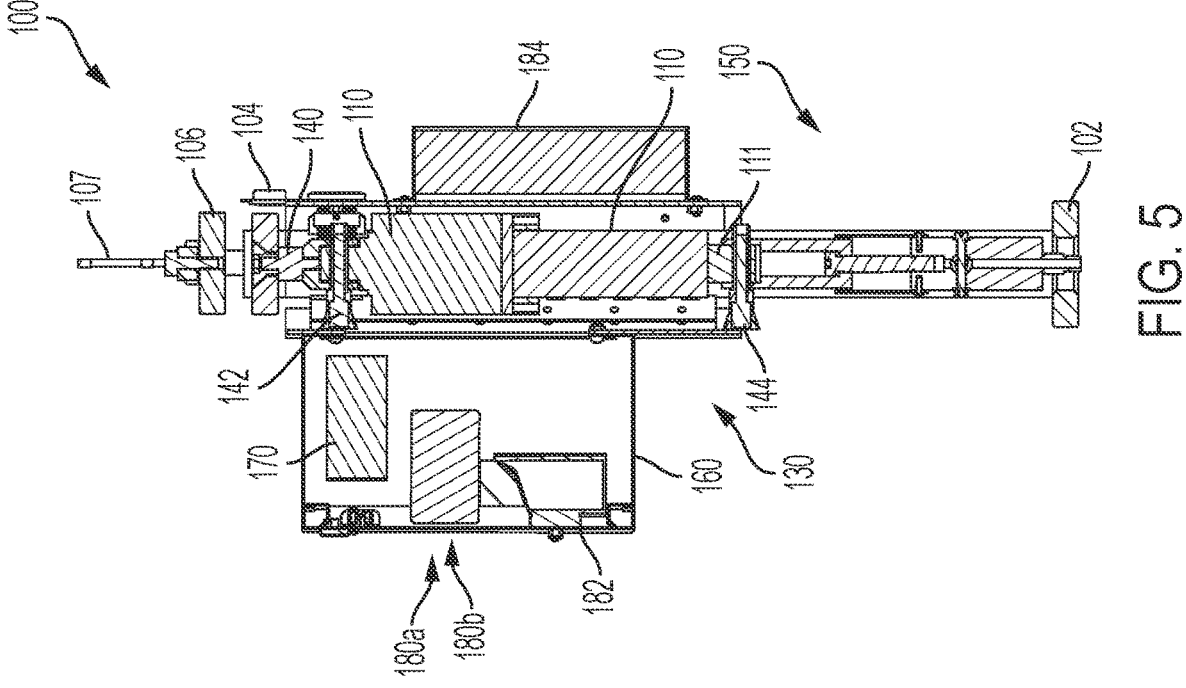
FIG. 5 is a section view of the upper assembly of FIG. 4 taken through line 5-5 in FIG. 4.
Figure 4:
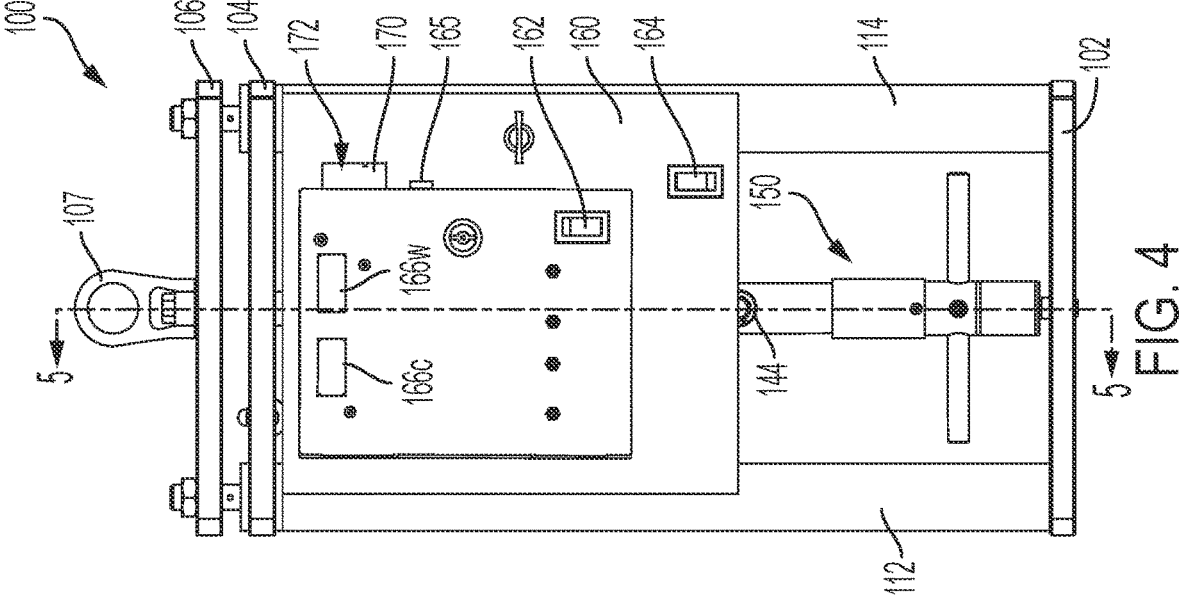
FIG. 4 is a front view of the upper assembly of FIG. 3.
Figure 6:
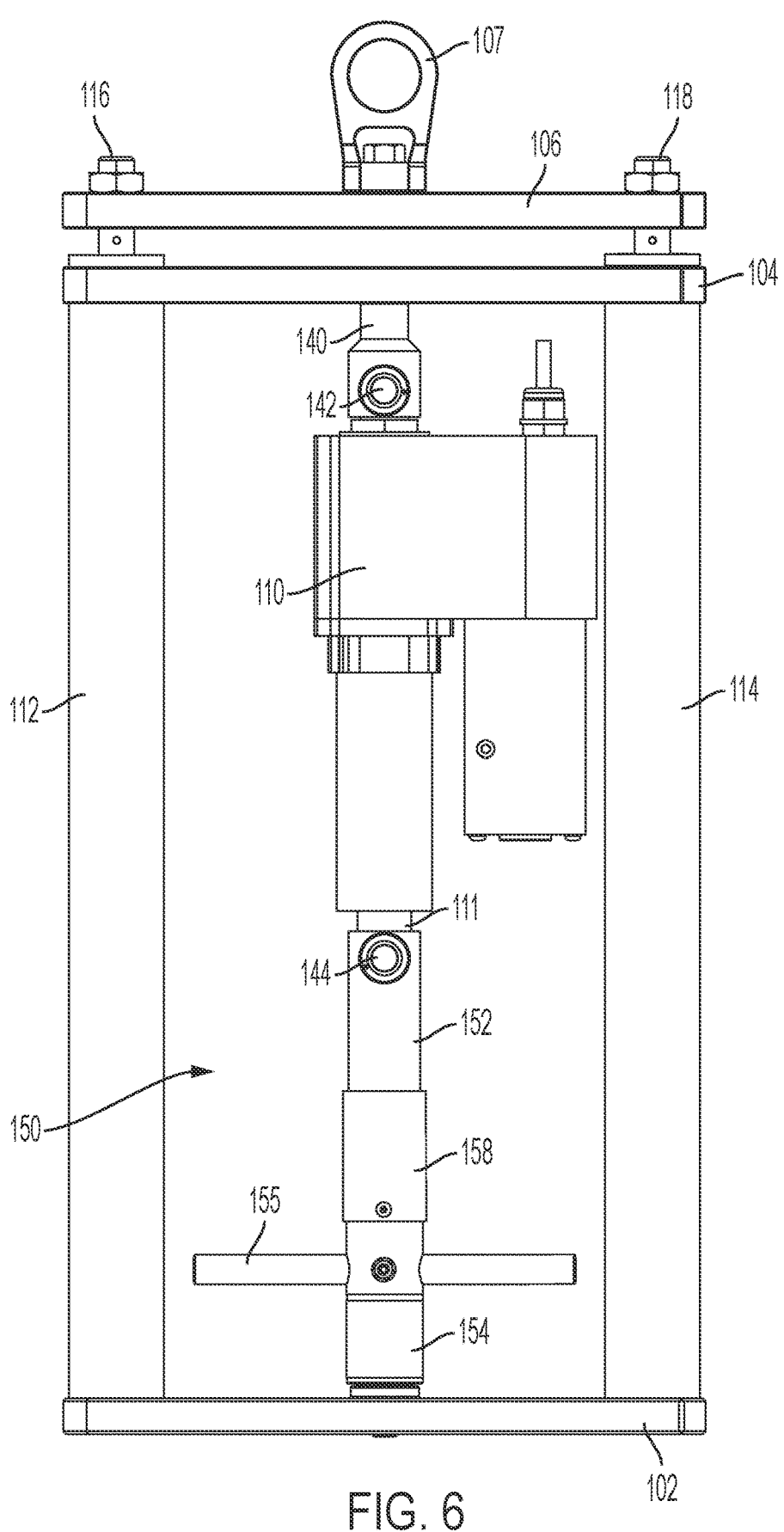
FIG. 6 is a front view of the upper assembly of FIG. 3 with a front and back electrical panel of the upper assembly removed for illustrative purposes.
Figure 18:
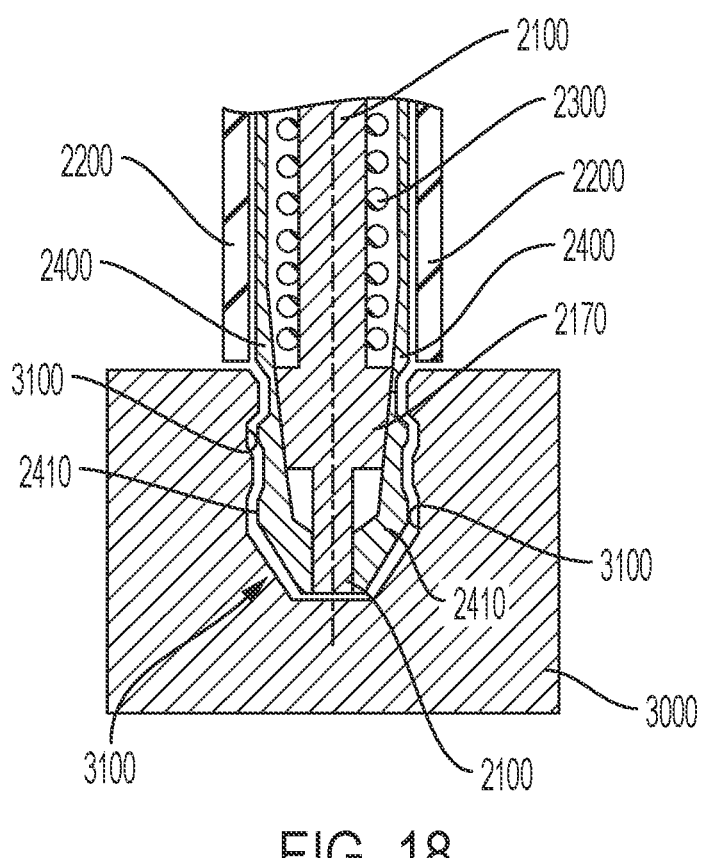
FIG. 18 is an enlarged view of the bottom end of the extension shaft assembly of FIG. 17.

Referring primarily to FIGS. 4, 5, and 18, the upper assembly 100 further comprises a control panel 160 extending from the support structure 130, a controller 170 positioned within the control panel 160, batteries 180a, 180c positioned within the control panel 160, and a backup power supply converter 184. Each of the batteries 180a, 180c are positioned within a battery holder 182 that is attached to the inside of the control panel 160. The battery 180a is electrically coupled to the linear actuator 110 and is configured to supply power to the linear actuator 110. The battery 180b is electrically coupled to the controller 170 and is configured to supply power to the controller 170. In at least one aspect, the controller 170 is a microcontroller. In at least one aspect, the microcontroller 170 comprises an indicator, or a display 172 visible to the user of the tool 1000. In at least one aspect, at least one of the batteries 180a, 180c is a rechargeable lithium-ion battery. In at least one aspect, at least one of the batteries 180a, 180c is a replaceable lithium-ion battery. In at least one aspect, at least one of the batteries 180a, 180c comprises detachable battery pack. In at least one aspect, at least one of the batteries 180a, 180c is a 12 volt battery. In at least one aspect, the backup power supply converter 184, is an AC/DC converter that converts 120 volt AC power from the refueling bridge into 12 volt DC power for powering the electrical components of the tool 1000, such as the controller 170 and linear actuator 110, among others.

Figure 19:
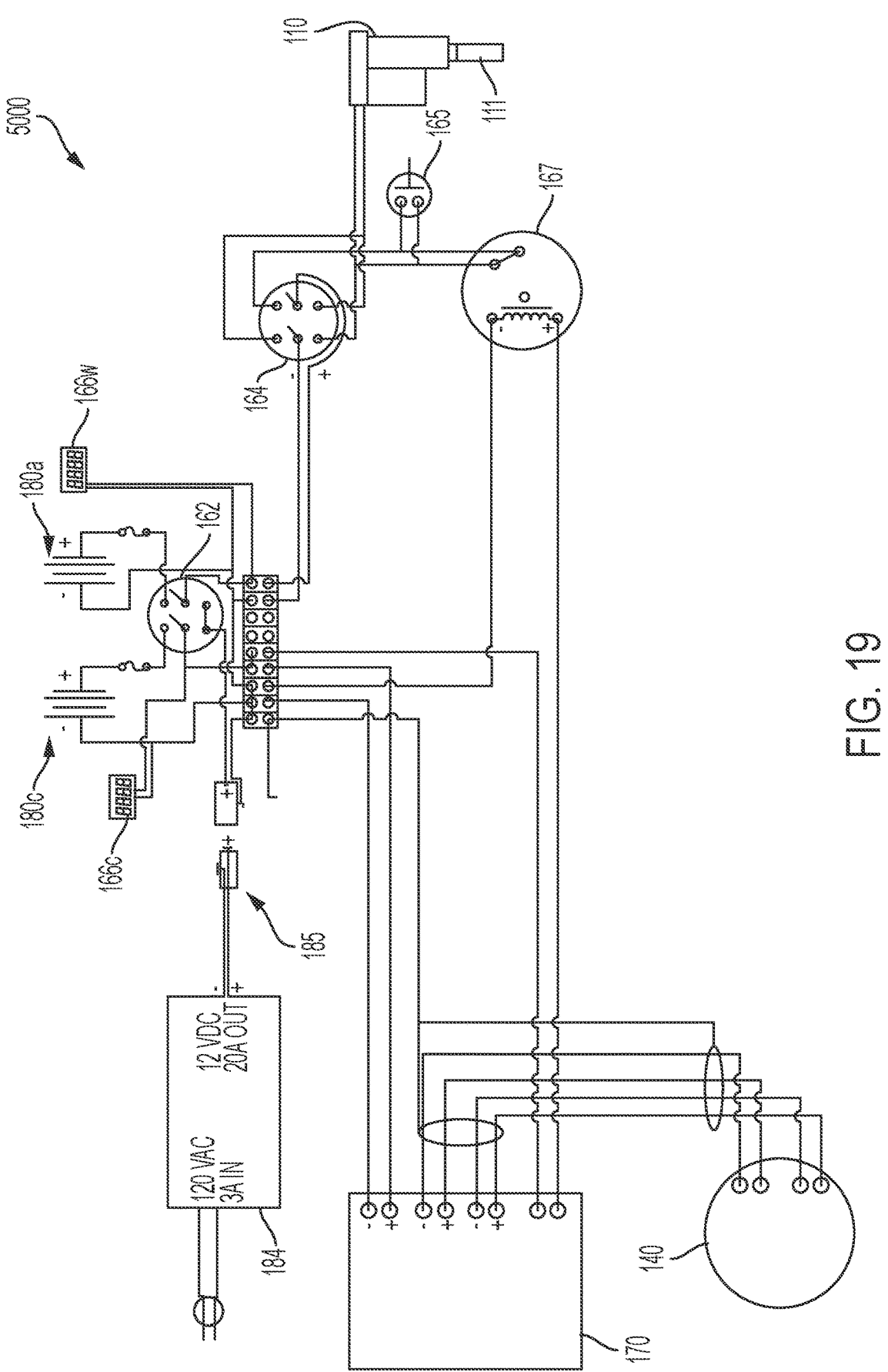
FIG. 19 is a diagram of an electrical circuit of the tool of FIG. 1.

Referring primarily to FIG. 19, an electrical circuit 5000 of the tool 1000 is illustrated. The electrical circuit 5000 comprises the controller 170, the load cell 140, the batteries 180a, 180c, the backup power supply converter 184, and the linear actuator 110, among other elements. Further, the electrical circuit 5000 comprises a three position switch 162 movable between a first position, a second position, and a third position. When the switch 162 is in the first position, the battery 180a is electrically connected to the linear actuator 110 and the battery 180c is electrically connected to the controller 170. When the switch 162 is in the second position, power is prevented from being supplied to the controller 170 and the linear actuator 110. When the switch is in the third position, the controller 170 and the linear actuator 110 are electrically connected to the backup power supply converter 184 such that, when the circuit 5000 is electrically connected to a power supply on the refueling bridge, the backup power supply converter 184 will supply power to the controller 170 and the linear actuator 110 from the power supply on the refueling bridge.

The electrical circuit 5000 further comprises a momentary switch 164 actuatable into an up position for retracting the linear drive 111 of the linear actuator 110 in the upward direction UD and a down position for extending the linear drive 111 of the linear actuator 110 in the downward direction DD. When the three position switch 162 is in either the first position or the third position and the momentary switch 164 is depressed into the up/retract position, power is supplied to the linear actuator 110 and the linear drive 111 of the linear actuator 110 will move in the upward direction UD until the user releases the momentary switch 164. When the three position switch 162 is in either the first position or the third position and the momentary switch 164 is depressed into the down/extend position, power will be supplied to the linear actuator 110 and the linear drive 111 of the linear actuator 110 will move in the downward direction DD until the user releases the momentary switch 164.

Further to the above, the electrical circuit 5000 further comprises a volt meter 166c for measuring the voltage of the controller 170 and a volt meter 166w for measuring the voltage of the linear actuator 110. Each of the volt meters 166c, 166w comprises a display which displays the voltages of the controller 170 and the linear actuator 110 to the user of the tool 1000. The volt meters 166c, 166w are positioned within the circuit 5000 such that they will measure and display the voltages across the controller 170 and the linear actuator 110 regardless of where the power is being supplied from (i.e., from the batteries 180a, 180c and/or from the backup power supply converter 184). In at least one aspect, the display is configured to display the monitored parameter of the sensor 140. In at least one aspect, the display displays the force experienced by at least a portion of the extension shaft assembly during the uncoupling and coupling operations described here.

In various aspects, the upper assembly 100 comprises a power supply connector, such as the power supply connector 185 illustrated in FIG. 19. In at least one aspect, the power supply connector 185 comprises a quick disconnect connection between the power converter 184 and the remainder of the electrical circuit 5000. In at least one aspect, a power supply connecter, similar or equal to the power supply connector 185, is positioned intermediate the batteries 180a, 180c and the electrical circuit 5000 such that the batteries 180a, 180c can be quickly and easily disconnected from, and then reconnected to, the electrical circuit 5000.

Further to the above, in at least one aspect, the load cell 140 comprises a 0 to 3,000 lbs. mini load cell. Further, in at least one aspect, the load cell 140 is at least one of a hydraulic load cell, a pneumatic load cell, a strain gauge load cell, a pezoresistive load cell, an inductive and reluctance load cell, a magnetostrictive load cell, and/or combinations thereof. As discussed above, the load cell 140 is connected to the intermediate plate 104 and the linear actuator 110 hangs from the load cell 140. As such, the weight of the linear actuator 110 and the components hanging from the linear actuator 110 will also be read by the load cell 140. However, the user of the tool 1000 can tare (i.e., set to zero) the load cell 140 so that the weight of the components hanging from the load cell 140 are not factored into the forces measured by the load cell 140. The load cell 140 can be set to zero prior to and/or after the tool 1000 is attached to the extension shaft assembly 2000 as described herein, for example. When the tool 1000 is attached to an extension shaft assembly 2000 in the various configurations described above, the sensor 140 will measure a parameter indicative of the force experienced by the extension shaft assembly 2000 as the tool 1000 transitions the extension shaft assembly 2000 between the coupled configuration and the uncoupled configuration. More specifically, the load imparted on the inner shaft 2100 of the extension shaft assembly 2000 by the linear actuator 110 as the linear actuator 110 moves the inner shaft 2100 relative to the outer shaft 2200 can be measured by the load cell 140.

In various aspects, the sensor 140 is configured to measure a parameter during the uncoupling and coupling operations. It at least one aspect, the sensor 140 is a load cell and is configured to measure a parameter indicative of a force experienced by at least a portion of the extension shaft assembly 2000 during the uncoupling and coupling operations. In at least one aspect, the sensor 140 is a strain gauge and is configured to measure a parameter indicative of a strain experienced by at least a portion of the extension shaft assembly 2000 during the uncoupling and coupling operations. In various aspects, the parameter measured by the sensor 140 is selected from the group of a force, a strain, a weight, a pressure, etc.

Further to the above, in various aspects, the controller 170 of the electrical circuit 5000 is programmable to prevent excessive forces from being applied to the extension shaft assembly 2000 during attachment of the tool 1000 to the extension shaft assembly 2000 and/or during the uncoupling/coupling of the extension shaft assembly 2000 to the CEA 3000, as described herein. For example, in at least one aspect, the microcontroller 170 is programmed to prevent the supply of power to the linear actuator 110 when the force applied to the extension shaft assembly 2000 exceeds a predetermined threshold force. In at least one aspect, the predetermined threshold force is set by a user of the tool 1000 by programming the threshold force into the controller 170. In at least one aspect, the predetermined force is approximately 2000 lbs. In any event, the load cell 140 is utilized to monitor the force imparted by the tool 1000 onto the extension shaft assembly 2000 during attachment of the tool 1000 to the extension shaft assembly 2000 and/or during uncoupling/decoupling operations of the extension shaft assembly 2000 to the CEA 3000. In various aspects, when the load cell 140 measures a force above the predetermined threshold force, the load cell 140 sends a signal to the controller 170 and the controller 170 will cut off the supply of power from the power source to the linear actuator 110. As long as the monitored force of the load cell 140 does not exceed the predetermined threshold force, the controller 170 will permit power to be supplied to the linear actuator 110 until the user releases the momentary switch 164 to stop the flow of power to the linear actuator 110.

Figure 3:
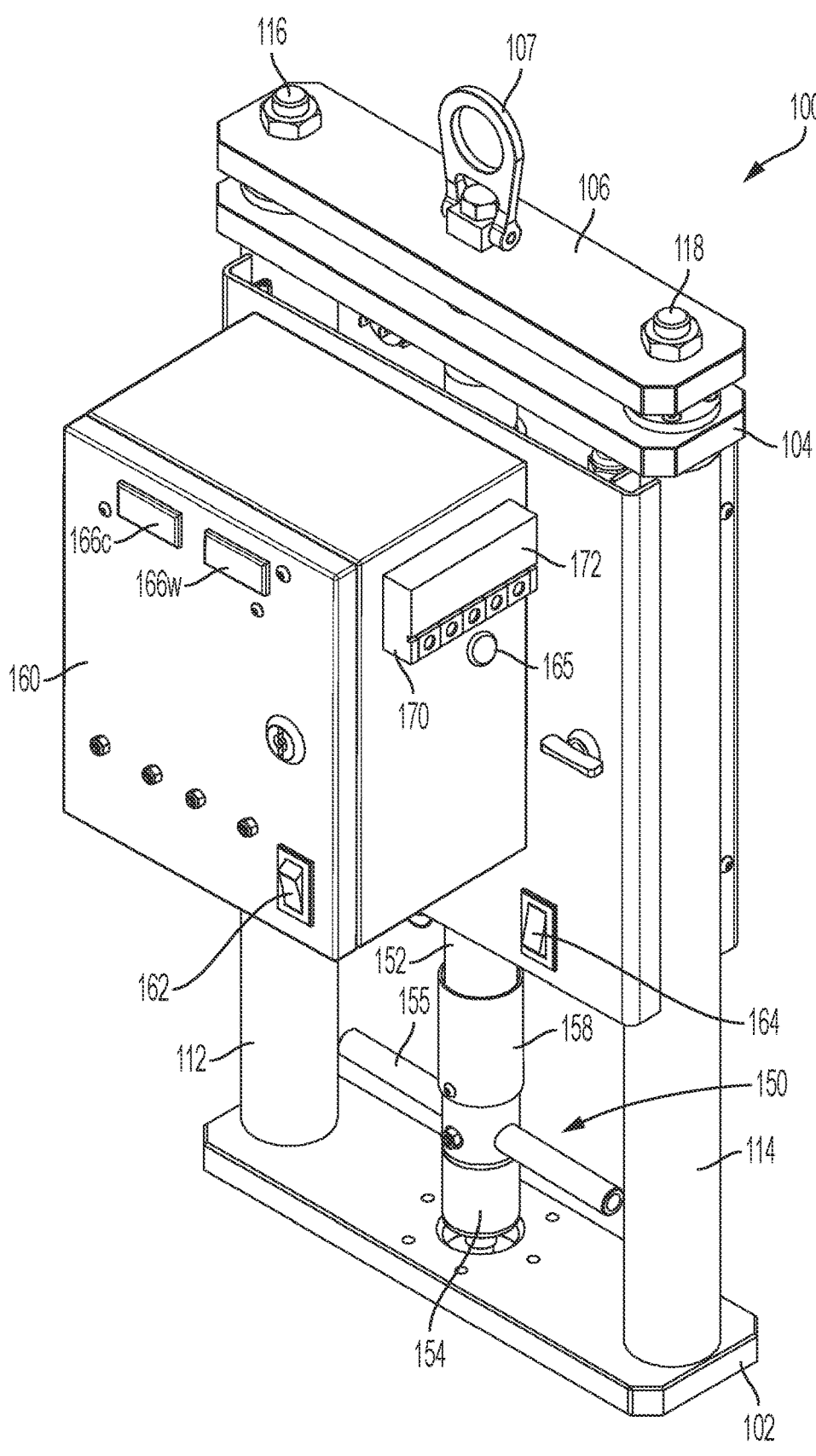
FIG. 3 is a perspective view of an upper assembly of the tool of FIG. 1.

Further to the above, the electrical circuit 5000 further comprises a single pole double throw relay 167 (FIG. 19) and an override switch 165 (FIG. 3 and FIG. 19). In at least one aspect, the override switch 165 is a push button switch which, when actuated, permits a user to override the pre-programmed force settings of the controller 170. In at least one aspect, the override switch 165, when closed, permits the controller 170 to exceed the predetermined threshold force programmed into the controller 170 by the user. In at least one aspect, when the override switch 165 is closed, the controller 170 permits power to be supplied to the linear actuator 110 regardless of the force reading of the load cell 140. In such instances, the tool 1000 is permitted to exceed the predetermined threshold force that was pre-programmed into the controller 170. In various aspects, a user may be required to exceed the predetermined threshold force set in the controller 170 in order to successfully decouple and/or couple the extension shaft assembly 2000 and the CEA 3000. In at least one aspect, the predetermined threshold force may be required to be exceeded to overcome the stiction within the extension shaft assembly 2000 and/or between the extension shaft assembly 2000 and the CEA 3000 caused by the previous 18 months or more of service within the reactor core. As such, the override switch 165 provides the user with an override to allow more than the predetermined threshold force to be applied to the extension shaft assembly 2000 during the uncoupling and coupling operations described herein.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A tool for uncoupling and coupling an extension shaft assembly from a control element assembly of a nuclear reactor during reactor servicing, wherein the extension shaft assembly is transitionable between a coupled configuration where the extension shaft assembly is coupled to the control element assembly and an uncoupled configuration where the extension shaft assembly is uncoupled from the control element assembly, and wherein the tool comprises:

a framework selectively attachable to the extension shaft assembly;

a linear actuator comprising a linear drive that is actuatable relative to the framework through an actuation stroke;

a microcontroller coupled to the linear actuator, wherein the microcontroller is to actuate the linear drive of the linear actuator;

a power source connector coupled to the microcontroller, wherein the power source connector is to be coupled to a power source for supplying power to the microcontroller and the linear actuator;

a plunger shaft selectively attachable to the extension shaft assembly, wherein the plunger shaft is movable relative to the framework and is operably engaged with the linear drive, wherein the extension shaft assembly is transitionable from the coupled configuration to the uncoupled configuration when the framework is attached to the extension shaft assembly, the plunger shaft is attached to the extension shaft assembly, and the linear drive of the linear actuator moves the plunger shaft through a first actuation stroke in a first direction, wherein the extension shaft assembly is transitionable from the uncoupled configuration to the coupled configuration when the framework is attached to the extension shaft assembly, the plunger shaft is attached to the extension shaft assembly, and the linear drive of the linear actuator moves the plunger shaft through a second actuation stroke in a second direction opposite the first direction; and a sensor coupled to the microcontroller and the linear actuator, wherein the sensor monitors a parameter indicative of a force experienced by the extension shaft assembly during at least one of the first actuation stroke or the second actuation stroke.

2. The tool of claim 1, wherein the microcontroller prevents the supply of power from the power source to the linear actuator based on the monitored parameter and a predetermined threshold.

3. The tool of claim 2, wherein the microcontroller prevents the supply of power from the power source to the linear actuator based on the monitored parameter exceeding the predetermined threshold during at least one of the first actuation stroke or the second actuation stroke.

4. The tool of claim 1, wherein the sensor comprises a load cell.

5. The tool of claim 1, further comprising an indicator to indicate to a user the monitored parameter.

6. The tool of claim 5, wherein the indicator comprises an electronic display to display the monitored parameter.

7. The tool of claim 1, further comprising the power source.

8. The tool of claim 7, wherein the power source comprises at least one battery pack that is selectively attachable to the power source connector.

9. The tool of claim 7, wherein the power source comprises at least one rechargeable battery pack.

10. The tool of claim 7, wherein the power source comprises at least one replaceable battery pack.

11. The tool of claim 7, wherein the microcontroller is to be coupled to at least one backup power source.

12. A tool for uncoupling an extension shaft assembly from a control element assembly of a nuclear reactor during reactor servicing, wherein the extension shaft assembly is transitionable from a coupled configuration where the extension shaft assembly is coupled to the control element assembly to an uncoupled configuration where the extension shaft assembly is uncoupled from the control element assembly, and wherein the tool comprises:

an upper assembly, comprising:

an electronic actuator comprising a driver that is actuatable relative to the upper assembly;

a microcontroller coupled to the electronic actuator, wherein the microcontroller is to actuate the driver of the electronic actuator; and a power source connector coupled to the microcontroller, wherein the power source connector is to be coupled to a power source for supplying power to the microcontroller and the electronic actuator;

a coupler supported by the upper assembly, wherein the coupler is selectively attachable to the extension shaft assembly, wherein the extension shaft assembly is transitioned from the coupled configuration to the uncoupled configuration when the coupler is attached to the extension shaft assembly and the driver of the electronic actuator moves a portion of the coupler through an actuation stroke; and a sensor coupled to the microcontroller and the electronic actuator, wherein the sensor monitors a parameter indicative of a force experienced by the extension shaft assembly during the actuation stroke.

13. The tool of claim 12, wherein the microcontroller prevents the supply of power from the power source to the electronic actuator based on the monitored parameter and a predetermined threshold.

14. The tool of claim 13, wherein the microcontroller prevents the supply of power from the power source to the electronic actuator based on the monitored parameter exceeding the predetermined threshold during the actuation stroke.

15. The tool of claim 12, wherein the sensor comprises a load cell.

16. The tool of claim 12, further comprising an indicator to indicate to a user the monitored parameter.

17. The tool of claim 16, wherein the indicator comprises an electronic display to display the monitored parameter.

18. The tool of claim 12, further comprising the power source.

19. The tool of claim 18, wherein the power source comprises at least one battery pack that is selectively attachable to the power source connector.

20. The tool of claim 18, wherein the power source comprises at least one rechargeable battery pack.

21. The tool of claim 18, wherein the power source comprises at least one replaceable battery pack.

22. The tool of claim 18, wherein the microcontroller is to be coupled to at least one backup power source.

* * * * *